United States Patent [19]

Shibata et al.

[11] Patent Number: 5,410,456
[45] Date of Patent: Apr. 25, 1995

[54] VEHICULAR CORNERING LAMP SYSTEM

[75] Inventors: Hiroki Shibata; Tomoaki Serizawa, both of Shizuoka, Japan

[73] Assignee: Koito Manufacturing Co., Ltd., Tokyo, Japan

[21] Appl. No.: 151,153

[22] Filed: Nov. 12, 1993

[30] Foreign Application Priority Data

Nov. 16, 1992 [JP] Japan .................. 4-084749 U
Nov. 16, 1992 [JP] Japan .................. 4-084750 U

[51] Int. Cl.⁶ .................. B60Q 1/076; B60Q 1/12
[52] U.S. Cl. .................. 362/40; 362/37; 362/71
[58] Field of Search .................. 362/66, 72, 71, 40, 362/37

[56] References Cited

U.S. PATENT DOCUMENTS

| | | | |
|---|---|---|---|
| 4,276,581 | 6/1981 | Orii et al. | 362/71 X |
| 4,663,696 | 5/1987 | Miyazawa et al. | 362/80 |
| 4,733,333 | 3/1988 | Shibata et al. | 362/40 |
| 4,827,388 | 5/1989 | Miyazawa | 362/284 |
| 4,831,506 | 5/1989 | Miyazawa | 362/284 |
| 4,833,573 | 5/1989 | Miyauchi et al. | 362/72 |
| 4,860,601 | 4/1989 | Shibata et al. | 73/865.8 |
| 4,908,560 | 3/1990 | Shibata et al. | 318/603 |
| 4,943,893 | 7/1990 | Shibata et al. | 362/37 |
| 4,963,794 | 10/1990 | Shibata et al. | 315/81 |
| 4,970,906 | 11/1990 | Shibata et al. | 73/865.8 |
| 5,099,400 | 3/1992 | Lee | 362/40 X |

FOREIGN PATENT DOCUMENTS

0077252  4/1987  Japan .................. 362/37

Primary Examiner—Ira S. Lazarus
Assistant Examiner—Thomas M. Sember
Attorney, Agent, or Firm—Sughrue, Mion, Zinn, Macpeak & Seas

[57] ABSTRACT

A vehicular cornering lamp system which reduces spark noise generated by a motor thereof, reduces wear of parts such as the brushes and commutator of the motor, and improves the rate of use of the power voltage of the system and thereby generates sufficient torque to rotate the motor. An illumination direction control circuit generates voltages to be applied to the two terminals of the motor according to differences between the output voltage of a lamp illumination angle sensor and the output voltage of a steering sensor. The illumination direction control circuit applies the center voltage of a supply battery voltage to the two terminals of the motor when the voltage difference is zero, and as the voltage difference increases, changes the voltages applied to the motor terminals in a direction such that a difference between the applied voltages increases, and, as the voltage difference decreases, changes the voltages applied to the motor terminals in a direction such that the difference between the applied voltages decreases.

9 Claims, 6 Drawing Sheets

VEHICULAR CORNERING LAMP SYSTEM

BACKGROUND OF THE INVENTION

The present invention relates to a vehicular cornering lamp system which can change the illumination angle of a headlamp or other vehicular lamp according to the steering angle of the vehicle.

A conventional vehicular cornering lamp system is disclosed in Japanese Patent Publication No. Sho. 64-67439. In the conventional cornering lamp system, a control signal is generated having a pulse width corresponding to the steering angle of the vehicle, a difference between the actual illumination direction of the headlights of the vehicle and the target illumination direction based on the steering angle of the vehicle is detected in accordance with the control signal, and a motor (two-terminal motor) for changing the illumination direction is PWM (pulse-width modulation) controlled in accordance with the difference.

However, in the conventional cornering lamp system, due to the fact that the voltage applied to the two terminals of the motor is in the form of pulses, spark noise is generated when the motor is turned on and off, which has an adverse effect on the transmission and reception properties of wireless communications equipment such as a car radio or the like. Also, the sparks generated when the motor is turned on and off increases the rate of wear of the brushes and commutator of the motor, which reduces the service life of the motor.

Another conventional cornering lamp system includes a motor which changes the illumination angle of the lamp, an illumination angle sensor which outputs a voltage corresponding to the illumination angle of the lamp, a steering angle sensor which outputs a voltage corresponding to the steering angle, and a control circuit which controls the rotation of the motor so that the difference between the output voltages of the illumination angle sensor and steering angle sensor is zero.

However, in the cornering lamp system of the above type, if the steering sensor malfunctions, then the illumination angle of the lamp becomes uncontrollable, which may result in dazzling the driver of an oncoming vehicle or cause other dangerous problems.

Figure 8:
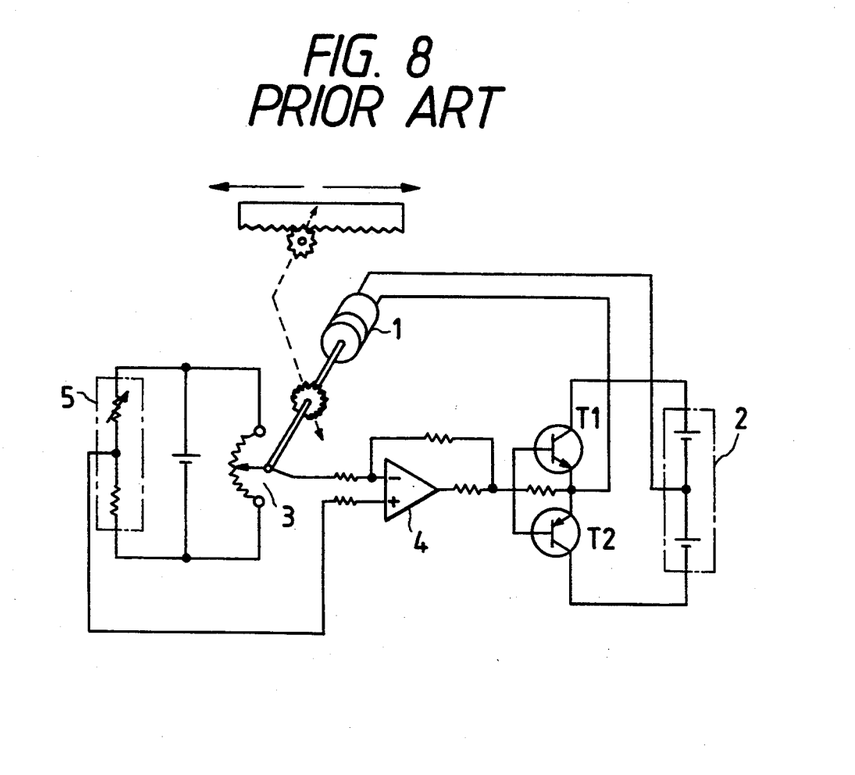
FIG. 8 is schematic diagram illustrating a conventional vehicular cornering lamp system.

An example of a conventional analog control structure for a cornering lamp system is shown in FIG. 8. In this structure, the power voltage of the vehicle's electrical system is applied to one terminal of a motor 1, while the voltage applied to the other terminal of the motor 1 is controlled. That is, a voltage value corresponding to the actual rotation angle is applied from a potentiometer 3 to the inverting input terminal of an operational amplifier 4, a voltage value corresponding to the target rotation angle is applied from a setting device 5 to the non-inverting input terminal of the operational amplifier 4, and transistors T1 and T2 are driven on and off in accordance with the output of the operational amplifier 4, thereby controlling the voltage applied to the other terminal of the motor 1.

However, in the above analog control structure, at most only one-half of the power voltage can be applied between the two terminals of the motor 1. For this reason, the power voltage of the vehicle's battery (nominal battery voltage: +12 V) is too low to obtain the torque necessary to drive the motor properly.

SUMMARY OF THE INVENTION

The present invention aims at eliminating the problems found in the above-mentioned conventional systems. Accordingly, it is an object of the invention to provide a vehicular cornering lamp system which can reduce the spark noise generated by the motor, contribute to the enhancement of the durability of parts such as the motor's brushes, commutator and the like, and can enhance the use of the available power voltage to thereby allow the motor to generate sufficient torque.

In attaining the above and other objects, according to a first embodiment of the invention, there is provided a vehicular cornering lamp system in which the voltages applied to the two terminals of a motor are changed according to the differences between voltages that are output from an illumination angle sensor and a steering angle sensor. That is, when the voltage difference is zero, then substantially the central voltage of the on-board battery (i.e., half the power supply voltage) is applied to both terminals of the motor. As the voltage difference increases, the voltage applied between the two terminals of the motor is changed in a direction such that the difference between the output voltages increases, and, as the voltage difference decreases, the voltage applied between the two terminals of the motor is changed in a direction such that the difference between the output voltages decreases.

There may further be provided means for subtracting a value, which increases as the voltage output from the illumination angle sensor becomes greater, from the voltage applied across the motor.

Thus, when a difference between the voltages that are respectively output from an illumination angle sensor and a steering angle sensor is zero, that is, when an actual illumination angle is coincident with a target illumination angle based on then steering angle, then substantially the center voltage of the on-board battery voltage is applied to both terminals of the motor, and hence no current is supplied, so that the motor is kept its stopped condition.

If the difference between the voltages respectively output from the steering angle sensor and illumination angle sensor increases, that is, if the difference between the target illumination angle and actual illumination angle increases, then the voltages applied to the two terminals of the motor are changed in a direction such that the difference between them increases, and thus the current supplied to the motor is gradually increased.

On the other hand, if the difference between the voltages output from the steering angle sensor and illumination angle sensor increases, that is, if the difference between the target illumination angle and actual illumination angle decreases, then the voltages applied to the two terminals of the motor are changed in a direction such that the difference narrows, and thus the current supplied to the motor is gradually decreased.

Also, as mentioned above, a value may be subtracted from the voltages applied to the two terminals of the motor which becomes greater as the variation of the voltage output from the illumination angle sensor becomes greater, that is, as change in the actual illumination angle while following the target illumination angle becomes faster, and decreases as the variation of the voltage output from the illumination angle sensor becomes smaller. This enables the motor to be braked gently before the actual illumination angle reaches the target illumination angle.

Another object of the invention to provide a vehicle cornering lamp system which, when a steering sensor malfunctions, is able to cope with this failure immediately.

In attaining the above object, according to the invention there is provided a vehicle cornering lamp system which, in addition to the elements of the above-mentioned vehicle cornering lamp systems, further includes mode switching means for switching a control mode in the control circuit according to the operation of a manual switch to thereby forcibly direct the illumination angle of the lamp in the forward direction of the vehicle.

Therefore, according to the invention, if the manual switch is operated to thereby switch the control mode in the control circuit, the illumination direction is forcibly made to be the forward direction of the vehicle regardless of the output voltage of the steering sensor.

DESCRIPTION OF THE PREFERRED EMBODIMENTS

A description will be given below in detail of the present invention by way of preferred embodiments thereof.

Figure 1:
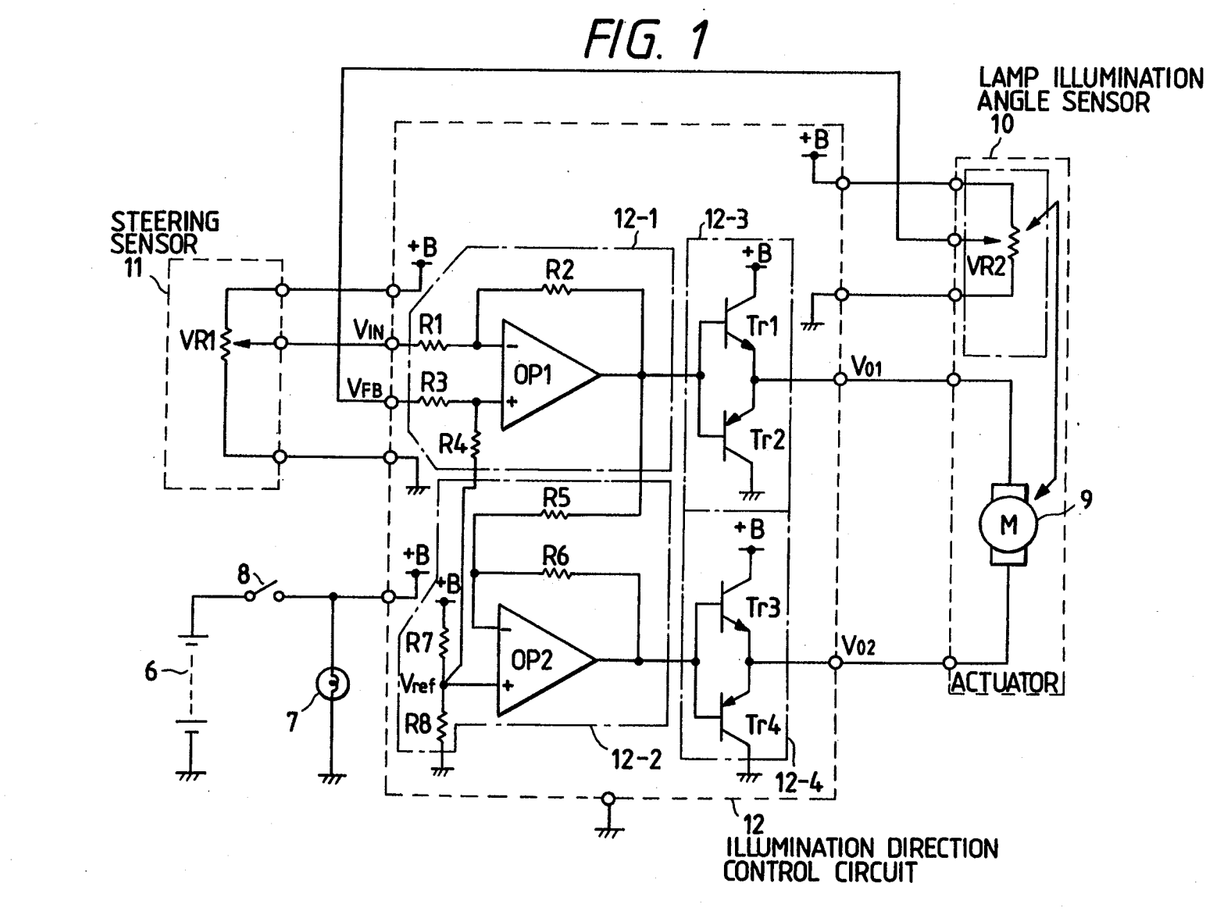
FIG. 1 is a circuit diagram of a first embodiment of a vehicular cornering lamp system according to the invention.

FIG. 1 is a circuit diagram of a first preferred embodiment of a vehicular cornering lamp system according to the invention. In FIG. 1, reference numeral 6 designates an on-board battery, 7, a headlamp, 8, a lighting switch, 9, a motor which is used to change the illumination angle of the headlamp 7, 10, a lamp illumination angle sensor which outputs a voltage $V_{FB}$ corresponding to the illumination angle of the headlamp 7 as determined by the rotation of the motor 9, 11, a steering sensor which outputs a voltage $V_{IN}$ corresponding to the rotation angle, that is, the steering angle of the steering gear wheel of the vehicle, and 12, an illumination direction control circuit.

In this embodiment, the lamp illumination angle sensor 10 and steering sensor 11 are both implemented with a variable resistor.

In the illumination direction control circuit 12, 12-1 designates a differential amplifier which is used to amplify a difference between the output voltage $V_{FB}$ of the lamp illumination angle sensor 10 and the output voltage $V_{IN}$ of the steering sensor 11, 12-2 indicates an inverting amplifier which inverts and amplifies the output voltage of the differential amplifier 12-1, mainly a reference voltage $V_{ref}$ corresponding to the illumination angle (0°) obtained while the vehicle is traveling in the straight-ahead direction, 12-3 indicates a first booster circuit which power amplifies the output voltage of the differential amplifier 12-1, and 12-4 represents a second booster circuit which power amplifies the output voltage of the inverting amplifier 12-2.

The differential amplifier 12-1, which includes an operational amplifier OP1 and resistances R1 to R4 (R1=R3, R2=R4), multiplies a difference between $V_{FB}$ and $V_{IN}$ by R2/R1. The inverting amplifier 12-2 includes an operational amplifier OP2 and resistances R5 to R8 (R5=R6, R7=R8). The first booster circuit 12-3 includes two transistors Tr1 and Tr2. The second booster circuit 12-4 includes two transistors Tr3 and Tr4.

In the circuit arrangement of the illumination direction control circuit 12, the output voltage $V_{01}$ of the first booster circuit 12-3 is applied to one terminal of the motor 9, while the output voltage $V_{02}$ of the second booster circuit 12-4 is applied to the other terminal of the motor 9.

Next, a description will be given of the operation of the present cornering lamp system.

It is assumed that the vehicle is traveling in the straight-ahead direction and the actual illumination angle is coincident with the target illumination angle (0°). That is, it is assumed that the difference between the output voltage $V_{FB}$ of the lamp illumination angle sensor 10 and the output voltage $V_{IN}$ of the steering sensor 11 is zero. In this case, the output voltages $V_{01}$ and $V_{02}$ of the first and second booster circuits 12-3 and 12-4 are both 6 V. That is, the center voltage of the on-board battery voltage (12 V) is applied to both terminals of the motor 9, and thus no current is supplied to the motor 9, whereby the motor 9 is kept in its stopped state.

From this state, if the steering wheel is turned, then the difference between the output voltage $V_{IN}$ of the steering sensor 11 and the output voltage $V_{FB}$ of the lamp illumination angle sensor 10 increases. For example, assuming that the output voltage $V_{IN}$ begins to increase from time t1 shown in FIG. 2(a) as the steering wheel is turned, then an amplified voltage corresponding to the difference between $V_{FB}$ and $V_{IN}$ is obtained by the differential amplifier 12-1, and an output voltage, which is the inverted and amplified version of the amplified voltage, is obtained by the inverting amplifier 12-2. As a result, the output voltage $V_{01}$ of the first booster circuit 12-3 begins to fall and the output voltage $V_{02}$ of the second booster circuit 12-4 begins to rise (see FIG. 2(b)). That is, the voltage applied between the two terminals of the motor 9 changes continuously in a direction such that the difference between the output voltages $V_{01}$ and $V_{02}$ widens, so that the current supplied to the motor 9 increases gradually.

If the difference between the voltages applied to the two terminals of the motor 9 further increases until time t2, then the motor 9 starts to rotate. As a result, the output voltage $V_{FB}$ begins to rise, the difference between the output voltages $V_{FB}$ and $V_{IN}$ begins to decrease, and the output voltages $V_{01}$ and $V_{02}$ begin to rise and fall, respectively. That is, the voltages applied between the two terminals of the motor 9 start to change continuously in directions such that the difference between them decreases, and thus the current supplied to the motor 9 starts to decrease gradually, thereby preventing a sudden increase in the rotational speed of the motor 9. When the speed at which the steering wheel is turned is balanced with the motor rotational speed and the difference between the voltages applied to the two terminals of the motor 9 is kept constant, the output voltage $V_{FB}$ rises following the voltage $V_{IN}$.

Figure 2A:
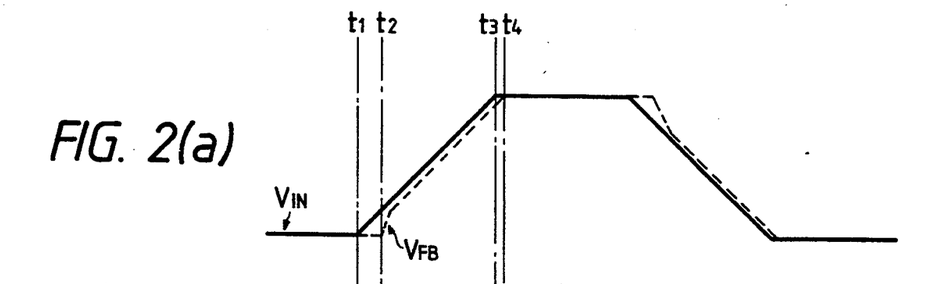
FIGS. 2(a) and 2(b) are waveform diagrams used to explain the operation of the cornering lamp system shown in FIG. 1.
Figure 2B:
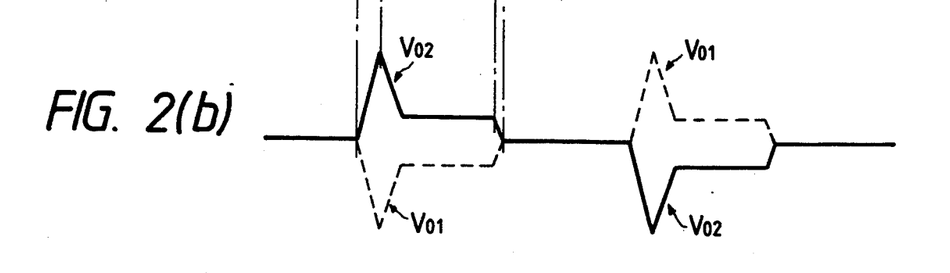

After completion of the steering operation, if the change of the output voltage $V_{IN}$ is stopped (at time t3 shown in FIG. 2(a)), then the difference between the voltages $V_{IN}$ and $V_{FB}$ begins to narrow from the constant difference up to that time. As a result, the output voltages $V_{01}$ and $V_{02}$, which have been applied as constant voltage values until that point, start to rise and fall respectively, the voltages applied to the two terminals of the motor 9 start to change continuously in a direction such that the difference between them narrows, the current supplied to the motor 9 begins to decrease gradually, the difference between the output voltages $V_{FB}$ and $V_{IN}$ decreases down to zero, and thus the rotational movement of the motor 9 is caused to stop (at time t4 shown in FIG. 3).

As has been described heretofore, according to the present embodiment, it is possible to prevent sudden rising and falling of the voltages applied to the two terminals of the motor 9 when the motor 9 is started and when it is braked, thereby to restrict the generation of sparks between the brushes and commutator of the motor 9 and to thereby reduce the amount of spark noise generated by the motor 9, and to enhance the durability of parts such as the brushes and commutator of the motor 9.

Also, according to the present embodiment, all of the on-board battery voltage (+12 V) can be applied to the two terminals of the motor 9 as the maximum value, which enhances the use of the power voltage of the system and makes it possible to generate sufficient torque in the motor 9.

In the above description, no force of inertia has been taken into consideration when causing the motor 9 to stop. However, the force of inertia may be significant in some instances, and, for this reason, an overshoot characteristic as shown in FIG. 3 may be produced.

Figure 3A:
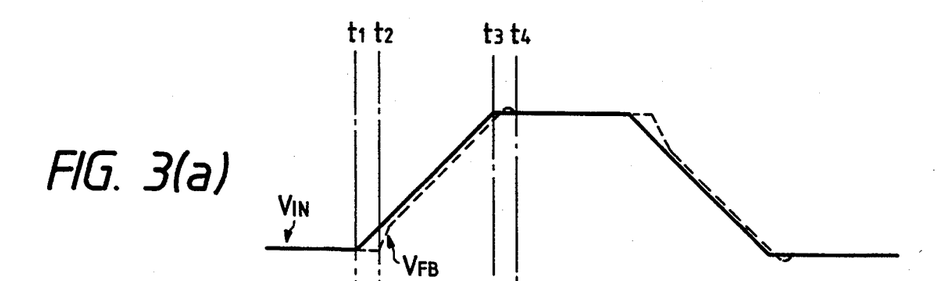
FIGS. 3(a) and 3(b) are waveform diagrams showing an overshoot characteristic generated due to a force of inertia produced when a motor is caused to stop.
Figure 3B:
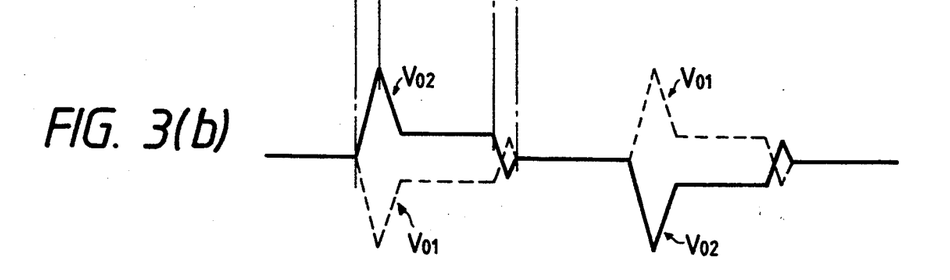

In other words, as a result of completion of the steering operation, if the change of the output voltage $V_{IN}$ stops (time t3 shown in FIG. 3(a)), the difference between the output voltages $V_{IN}$ and $V_{FB}$ starts to narrow from the constant difference present up to that time. Responsive to this, the output voltages $V_{01}$ and $V_{02}$, which have been applied as constant voltage values, start to rise and fall, respectively, the voltages applied to the two terminals of the motor 9 are caused to change continuously in a direction such that the difference between them narrows, the current supplied to the motor 9 is caused to decrease gradually, and the difference between the output voltages $V_{FB}$ and $V_{IN}$ goes to zero. In such a situation, due to the force of inertia thereof, the motor 9 is rotated excessively. This causes the difference between the output voltages $V_{FB}$ and $V_{IN}$ to increase in the direction opposite to the direction in which it was rotating up to that time. The output voltages $V_{01}$ and $V_{02}$ are caused to further rise and fall, respectively, according to the difference between the output voltages $V_{FB}$ and $V_{IN}$. As a result, a current is caused to flow in the motor 9 in the opposite direction to the direction in which it was flowing up to that time, so that the motor 9 is caused to rotate in the reverse direction. The reverse rotation of the motor 9 causes the difference between the output voltages $V_{FB}$ and $V_{IN}$ to decrease. The output voltages $V_{01}$ and $V_{02}$ are caused to fall and rise, respectively, according to the difference between $V_{FB}$ and $V_{IN}$, and when the difference between $V_{FB}$ and $V_{IN}$ goes to zero, the motor 9 is stopped (time t4 in FIG. 3).

Figure 4:
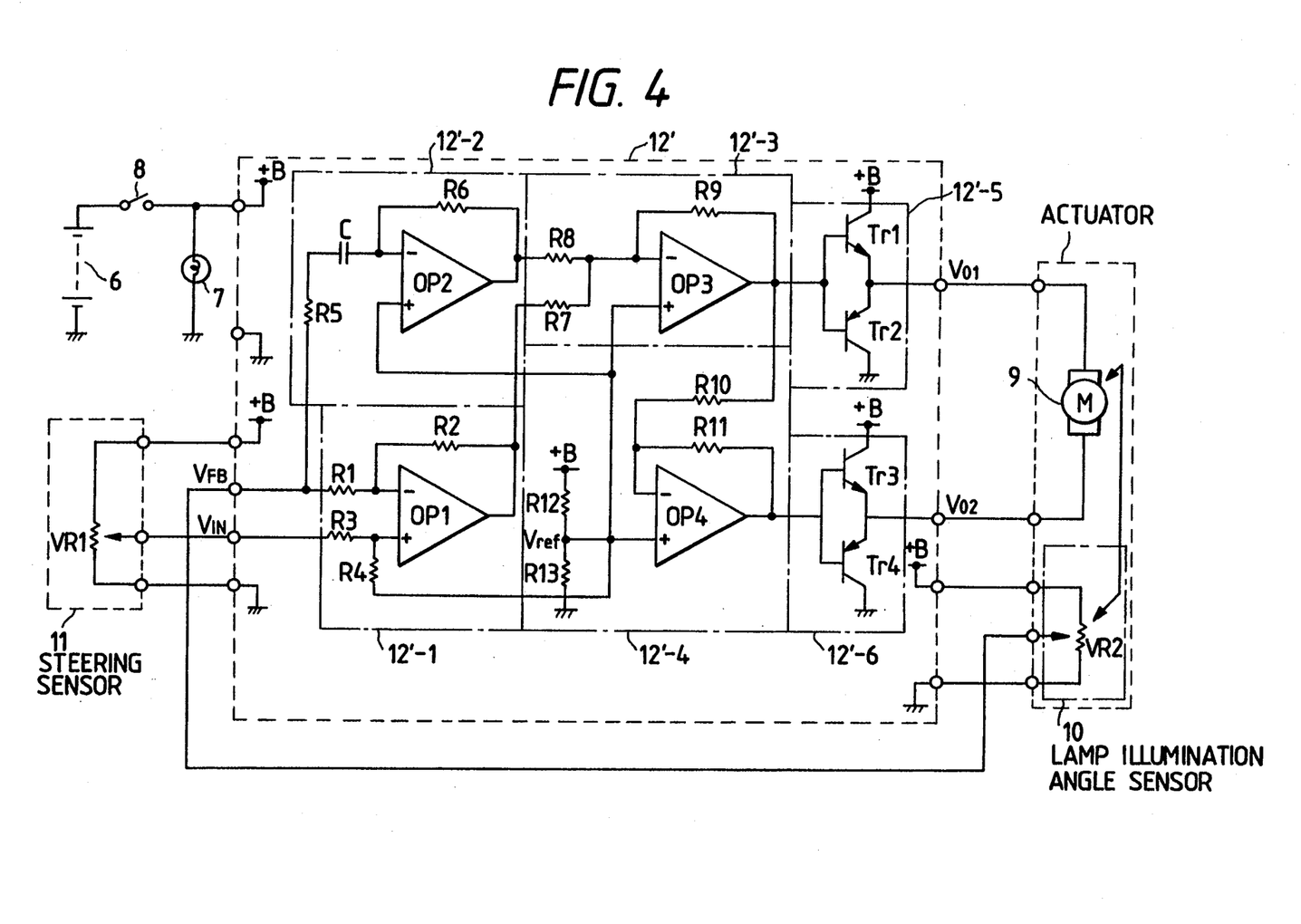
FIG. 4 is a circuit diagram of an embodiment of a second embodiment of a vehicular cornering lamp system according to the invention.

FIG. 4 is a circuit diagram of the structure of a second embodiment of a vehicular cornering lamp system according to the invention. In this embodiment, the force of inertia produced when the motor 9 is stopped is taken into consideration to thereby prevent generation of any overshoot due to the force of inertia.

In FIG. 4, like reference numerals and characters as in FIG. 1 designate the same or equivalent structural elements, and thus a further detailed description of such elements is omitted here.

The second embodiment shown in FIG. 4 is different from the cornering lamp system shown in FIG. 1 in the structure of an illumination direction control circuit 12'.

Figure 5:
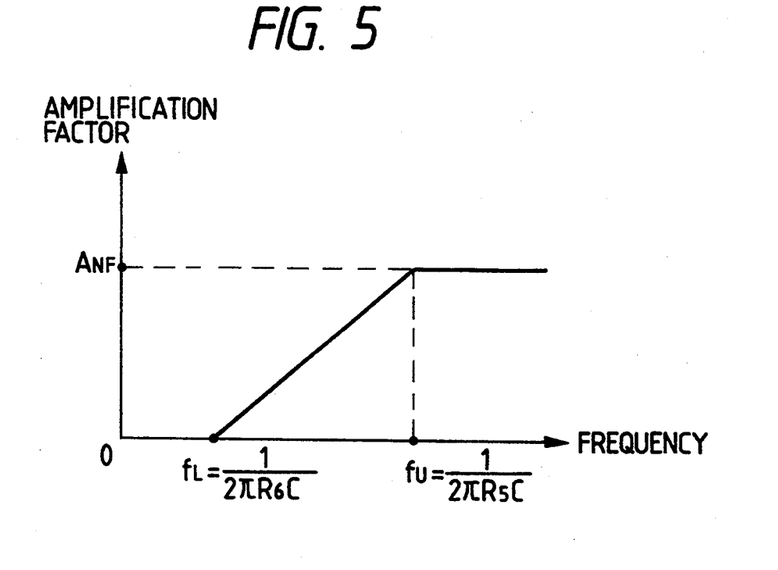
FIG. 5 is a graphical representation of a frequency-amplification factor characteristic of a differentiator employed in the cornering lamp system shown in FIG. 4.

In particular, in the illumination direction control circuit 12', 12'-1 designates a differential amplifier which is used to amplify a difference between the output voltage $V_{IN}$ of the steering sensor 11 and the output voltage $V_{FB}$ of the lamp illumination angle sensor 10, 12'-2, a differentiator which has frequency and amplification characteristics as shown in FIG. 5 and detects and invertedly amplifies the change of an output voltage (output voltage $V_{FB}$), 12'-3, an adder which adds and invertedly amplifies the output voltages of the differential amplifier 12'-1 and differentiator 12'-2, 12'-4, an inverting amplifier which inverts and amplifies the output voltage of the adder 12'-3, mainly a reference voltage $V_{ref}$ corresponding to the illumination angle (0°) when the vehicle is traveling in the straight-ahead direction, 12'-5, a first booster circuit which power amplifies the output voltage of the adder 12'-3, and 12'-6, a second booster circuit which power amplifies the output voltage of the inverting amplifier 12'-4.

Specifically, the differential amplifier 12'-1, which is composed of an operational amplifier OP1 and resistances R1 to R4 (R1=R3, R2=R4), multiplies the difference between the output voltages $V_{IN}$ and $V_{FB}$ by R2/R1. The differentiator 12'-2, composed of an operational amplifier OP2, resistances R5, R6, and a capacitor C, generates an output voltage, the absolute value of which increases with a reference voltage $V_{ref}$ as the center thereof as the absolute value of the change of an input voltage increases within a band shown in FIG. 5. The adder 12'-3, composed of an operational amplifier OP3 and resistances R7–R9, multiplies the output voltages of the differential amplifier 12'-1 and differentiator 12'-2 by factors of R9/R7 and by R9/R8, respectively, and then adds the products together. The inverting amplifier 12'-4 includes an operational amplifier OP4 and resistances R10 to R13 (R10=R11, R12=R13). The first booster circuit 12'-6 includes transistors Tr1 and Tr2. The second booster circuit 12'-6 includes transistors Tr3 and Tr4.

In the circuit arrangement of the present illumination direction control circuit 12', it is assumed that the output voltage $V_{01}$ of the first booster circuit 12'-5 is applied to one terminal of the motor 9 and the output voltage $V_{02}$ of the second booster circuit 12'-6 is applied to the other terminal of the motor 9.

Next, a description will be given of the operation of the present cornering lamp system.

It is assumed that the vehicle is traveling in the straight-ahead direction, the actual illumination angle is coincident with the target illumination angle (0°), and the difference between the output voltages $V_{FB}$ and $V_{IN}$ is zero. In this case, the output voltages $V_{01}$ and $V_{02}$ of the first and second booster circuits 12'-5 and 12'-6 are both 6 V, and hence the motor 9 is kept in its stopped condition.

Figure 6A:
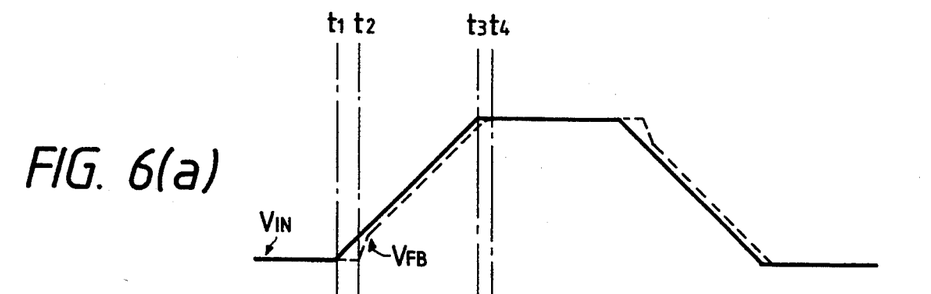
FIGS. 6(a)–6(d) are waveform diagrams used to explain the operation of the cornering lamp system shown in FIG. 4.
Figure 6B:
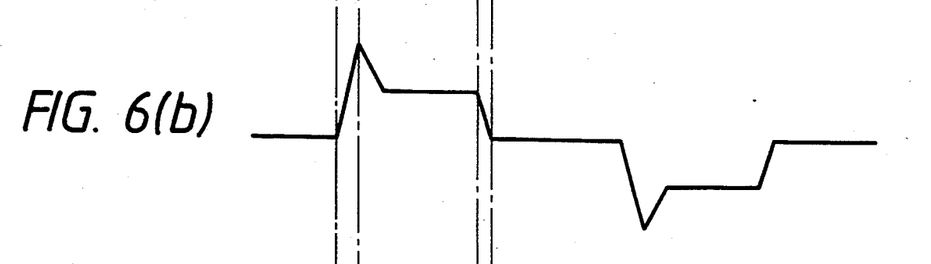
Figure 6C:
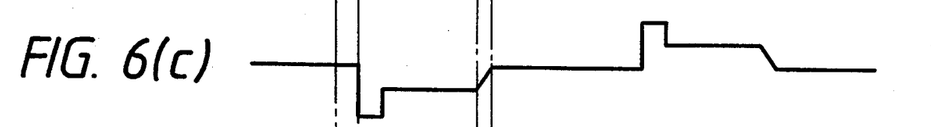
Figure 6D:
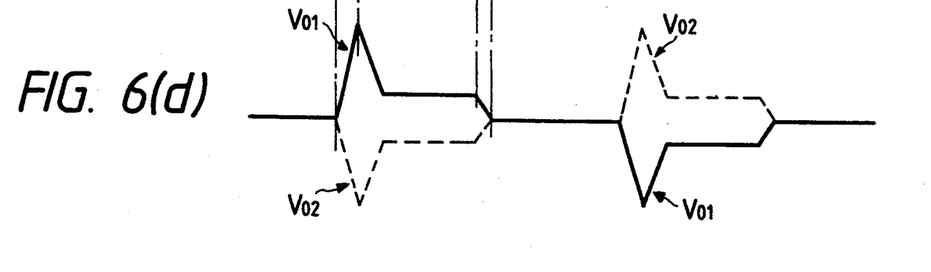

From the above conditions, if the output voltage $V_{IN}$ starts to rise from a time t1 shown in FIG. 6(a) responsive to a steering operation performed by the driver, then an amplification voltage corresponding to the difference between the output voltages $V_{IN}$ and $V_{FB}$ is obtained by the differential amplifier 12'-1 (see FIG. 6(b)), and the output voltages of the differential amplifier 12'-1 and differentiator 12'-2 are added together and invertedly amplified by the adder 12'-3. During this operation, because the output voltage $V_{FB}$ has not been changed yet, the output voltage of the differentiator 12'-2 maintains the reference voltage $V_{ref}$ (see FIG. 6(c)). In other words, the adder 12'-3 adds together the output voltages of the differentiator 12'-2 and differential amplifier 12'-1 and invertedly amplifies the sum of them, and then generates the thus invertedly amplified result as an output voltage. The output voltage of the adder 12'-3 is further inverted and amplified and is then provided as the output voltage of the inverting amplifier 12'-4. As a result, the output voltage of the first booster circuit 12'-5 starts to rise, while the output voltage $V_{02}$ of the second booster circuit 12'-6 starts to fall (see FIG. 6(d)). That is, the voltages applied to the two terminals of the motor 9 change continuously in a direction such that the difference between them widens, and thus the current applied to the motor 9 increases gradually.

If the difference between the voltages to be applied to the two terminals of the motor 9 widens further to the time t2, then the motor 9 begins to rotate. As a result, the output voltage $V_{FB}$ begins to rise, the difference between the output voltages $V_{FB}$ and $V_{IN}$ begins to decrease, and the output voltages $V_{01}$ and $V_{02}$ begin to fall and rise, respectively. That is, the voltages applied to the two terminals of the motor 9 change continuously in a direction such that the difference between them narrows, and thus the current supplied to the motor 9 decreases gradually, which makes it possible to prevent a sudden increase of the rotational speed of the motor 9.

During the above operation, the amplification factor increases as the change of the output voltage $V_{FB}$ increases, and the output voltage of the differentiator 12'-2 decreases. This reduces the amount of the output voltage of the differential amplifier 12'-1 to be applied to the adder 12'-3 and, according to the reduced amount, the output voltages $V_{01}$ and $V_{02}$ fall and rise, respectively. That is, from the voltages applied to the two terminals of the motor 9 there is subtracted a given value which varies according to the change of the output voltage $V_{FB}$, that is, which increases as the output voltage change increases.

When the steering wheel steering speed is balanced with the rotational speed of the motor 9, the difference between the voltages applied to the two terminals of the motor 9 is constant, and the output voltage $V_{FB}$ rises following the output voltage $V_{IN}$. During this time, the change of the output voltage $V_{FB}$ is smaller than at the start of rotation of the motor 9, and therefore the value to be subtracted from the voltages applied between the two terminals of the motor 9 is also caused to decrease.

Once the steering operation is completed and thus the change of the output voltage $V_{IN}$ stops (time t3 shown in FIG. 6(a)), then the difference between the output voltages $V_{IN}$ and $V_{FB}$ starts to narrow from its constant value up to that time. Responsive to this, the output voltages $V_{01}$ and $V_{02}$, which have been applied in the form of constant voltage values up to that time, start to fall and rise, respectively, the voltages applied to the two terminals of the motor 9 begin to change continuously in a direction such that the difference between them narrows, and the current supplied to the motor 9 begins to decrease gradually.

In this case, the value subtracted from the voltages applied to the two terminals of the motor 9 decreases as the change of the output voltage $V_{FB}$ decreases. Due to this, the motor 9 can be gradually braked before the actual illumination angle reaches the target illumination angle. Thus, overshooting, as has been described with reference to FIG. 3, will not be generated any longer, and the difference between the output voltages $V_{FB}$ and $V_{IN}$ goes to zero, so that the motor 9 is caused to stop at once (time t4 shown in FIG. 6).

As has been described heretofore, according to the first embodiment of the invention, the voltages applied to the two terminals of the motor are changed according to the difference between the output voltage of the illumination angle sensor and the output voltage of the driving wheel steering angle, that is, when the voltage difference is zero, then substantially the center voltage of the on-board battery voltage is applied to the two terminals of the motor. As the voltage difference increases, the voltages applied to the two terminals of the motor are changed in a direction such that the difference between them widens, and, as the voltage difference decreases, the voltages applied to the two terminals of the motor are changed in a direction such that the difference between them narrows. As a result, the invention reduces the amount of spark noise generated by the motor, contributes to the enhanced durability of structural parts thereof such as the brushes and commutator of the motor and the like, and improves the rate of use of the available power voltage, to thereby permit sufficient torque to be generated by the motor.

Also, according to the second embodiment of the invention, in addition to the operation of the first embodiment, a value which changes according to the change of the output voltage of the illumination angle sensor, that is, which increases as the rate of change of the output voltage of the illumination angle sensor increases, is subtracted from the voltages applied to the two terminals of the motor. Due to this, in addition to the effects of the first embodiment, in the second embodiment the generation of overshoot by a force of inertia produced when the motor is stopped is eliminated.

Figure 7:
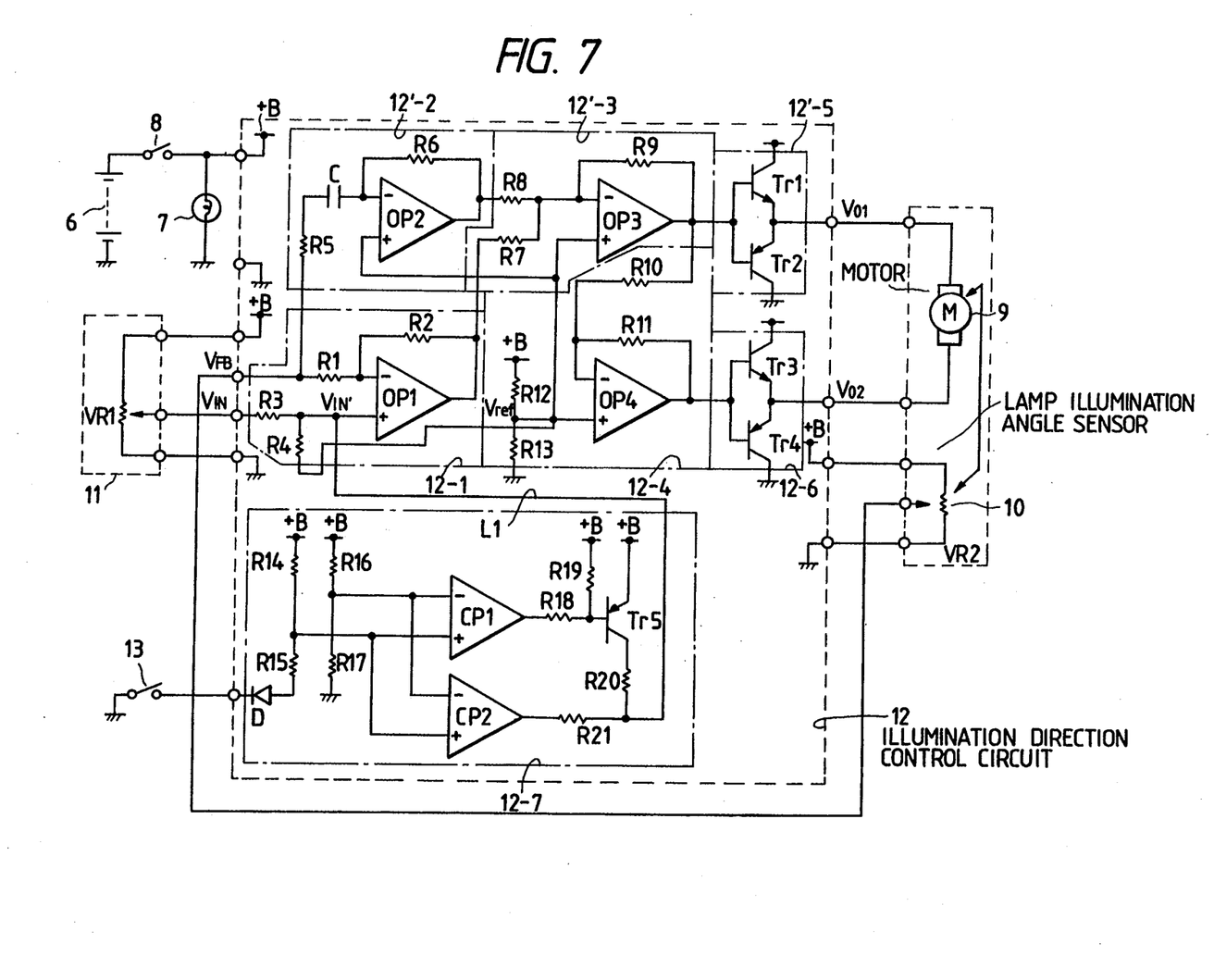
FIG. 7 is a circuit diagram of third embodiment of a vehicle cornering lamp system according to the invention.

A third embodiment of the invention will be described with reference to FIG. 7 of the accompanying drawings. In FIG. 7, like reference numerals and characters as in FIG. 4 designate the same or equivalent structural elements, and thus a further detailed description of such elements is omitted here. The third embodiment differs from the above-described second embodiment by the addition of a mode switching circuit 12-7.

The mode switching circuit 12-7 is composed of two comparators CP1 and CP2, a transistor Tr5, a diode D, and resistances R14–R21, in which one terminal of the manual switch 13 is connected to the cathode of the diode D and a connecting point between the resistances 20 and 21 (R20, R21<<R3, R4) is connected to the noninverting input terminal of the operational amplifier OP1 in the differential amplifier 12-1 via a line L1.

It is assumed that the steering sensor 11 has failed in such a manner that the output voltage $V_{IN}$ of the steering sensor 11 does not to change according to the steering angle. In this case, even if the steering wheel is steered back in the straight-ahead direction, the illumination angle cannot be changed in a such manner as to follow the steering operation, which can result in a dangerous situation.

In this instance, if the manual switch 13 is turned on, then the present system will operate in the following manner to thereby forcibly set the illumination angle in the straight-ahead direction, so that the above-mentioned dangerous situation can be avoided.

That is, if the manual switch 13 is turned on, then a current is allowed to flow in a passage including the resistances R14, R15 and diode D. At that time, the voltages applied to the noninverting input terminals of the comparators CP1 and CP2 fall, so that the outputs of the comparators CP1 and CP2 both go to zero. As a result of this, the transistor Tr5 is turned on, a division voltage is produced at the junction of the resistances R20 and R21, and the division voltage is applied through the line L1 to the noninverting input terminal of the operational amplifier OP1 in the differential amplifier 12-1. That is, the input voltage $V_{IN}'$ applied to the noninverting input terminal of the operational amplifier OP1 is made constant regardless of the output voltage $V_{IN}$ of the steering sensor 11.

As a result, in the illumination direction control circuit 12, the control mode is set such that the output voltage $V_{IN}$ of the steering sensor 11 is regarded as if it were a value corresponding to the steering angle 0°, and thus the motor 9 is driven regardless of the output voltage $V_{IN}$ of the steering sensor 11 in such a manner that the illumination angle is forcibly set in the straight-ahead direction.

As has been described heretofore, according to the invention, if the manual switch is operated to switch the control mode in the control circuit, then the illumination angle can be forcibly directed in the forward direction of the vehicle regardless of the output voltage of the steering sensor. Thanks to this feature, if the steering sensor malfunctions, the present invention is able to cope with the failure of the steering sensor immediately.

What is claimed is:

1. A vehicular cornering lamp system for changing the illumination angle of a lamp according to the steering angle of a vehicle, said system comprising:
   a motor for changing said illumination angle;
   an illumination angle sensor for providing a continuous output voltage corresponding to said illumination angle;
   a steering angle sensor for providing a continuous output voltage corresponding to said steering angle; and
   motor drive means for applying continuous voltages to two terminals of said motor according to a difference between said output voltage of said illumination angle sensor and said output voltage of the said steering angle sensor, in such a manner that when said voltage difference is zero, substantially a center voltage of a supply voltage is applied to said two terminals of said motor, and as said voltage difference increases, said voltages applied to said two terminals of said motor are changed such that a difference between said voltages applied to said two terminals increases, and, as said voltages difference decreases, said voltages applied to the two terminals of said motor are changed that said difference between said voltages applied to said two terminals voltages decreases.

2. The vehicular cornering lamp system of claim 1, wherein said motor drive means comprises:
   a first operational amplifier receiving on respective input terminals thereof said output voltages of said illumination angle sensor and said steering angle sensor;
   a second operational amplifier receiving on respective input terminals thereof an output of said first operational amplifier and a fixed reference voltage; and
   first and second booster circuits respectively receiving as inputs the outputs of said first and second operational amplifiers, outputs of said first and second booster circuits each being applied respectively to one of said two terminals of said motor.

3. A vehicular cornering lamp system for changing the illumination angle of a lamp according to the steering angle of a vehicle, said system comprising:
   a motor for changing said illumination angle;
   an illumination angle sensor for providing a continuous output voltage corresponding to said illumination angle;
   a steering angle sensor for providing a continuous output voltage corresponding to said steering angle; and
   motor drive means for applying continuous voltages to two terminals of said motor according to a difference between said output voltage of said illumination angle sensor and said output voltage of the said steering angle sensor, in such a manner that when said voltage difference is zero, substantially a center voltage of an on-board battery voltage is applied to said two terminals of said motor, and as said voltage difference increases, said voltages applied to said two terminals of said motor are changed such that a difference between said voltages applied to said two terminals increases, and, as said voltage difference decreases, said voltages applied to the two terminals of said motor are changed such that such difference between said voltages applied to said two terminal voltages decreases;
   means for providing a voltage value determined in accordance with changes of said output voltage of said illumination angle sensor, said voltage value increasing as changes in said output voltage of said illumination angle sensor increases; and
   voltage subtraction means for subtracting said voltage value from said voltages applied to said two terminals of said motor.

4. The vehicular cornering lamp system of claim 3, wherein:
   said means for providing a voltage value determined in accordance with changes of said output voltage of said illumination angle sensor comprises a differentiating circuit for differentiating said output voltage of said illumination angle sensor, and a first operational amplifier receiving on respective input terminals thereof an output of said differentiating circuit and a fixed reference voltage;

said motor drive means comprises a second operational amplifier receiving on respective input terminals thereof said output voltages of said illumination angle sensor and said steering angle sensor, and a third operational amplifier receiving on one input terminal thereof said fixed reference voltage; and said voltage subtraction means comprises a fourth operational amplifier receiving on respective input terminals thereof said fixed reference voltage and a sum of outputs of said first and second operational amplifiers, an output of said fourth operational amplifier being coupled to a second input terminal of said third operational amplifier.

5. The vehicle cornering lamp system of claim 4, wherein said motor drive means further comprises first and second booster circuits respectively receiving as inputs the outputs of said third and fourth operational amplifiers, outputs of said first and second booster circuits being applied respectively to one of said two terminals of said motor.

6. The vehicular cornering lamp system of claim 4, further comprising mode switching means for setting voltages on said input terminals of said second operational amplifier so as to thereby forcibly direct said illumination angle of said lamp in a forward direction.

7. The vehicular cornering lamp system of claim 6, wherein said mode switching means further comprises manual switch means for activating said mode switching means.

8. A vehicle cornering lamp system comprising:
a motor for changing the illumination angle of a lamp;
an illumination angle sensor for providing a continuous output voltage corresponding to said illumination angle;
a steering angle sensor for providing a continuous output voltage corresponding to a steering angle;
a control circuit for controlling said motor so that a difference between the output voltages of said illumination angle sensor and steering angle sensor is zero; and
mode switching means for switching a control mode in said control circuit to thereby forcibly direct said illumination angle of said lamp in a forward direction.

9. The vehicular cornering lamp system of claim 8, wherein said mode switching means further comprises manual switch means for activating said mode switching means.

* * * * *